(12) United States Patent
Schmitt et al.

(10) Patent No.: US 8,309,669 B2
(45) Date of Patent: Nov. 13, 2012

(54) USE OF SWELLABLE POLYMER FOR SEALING

(75) Inventors: Bardo Schmitt, Mainz-Kastel (DE); Mario Gomez, Pfungstadt (DE); Martina Ebert, Dieburg (DE)

(73) Assignee: Evonik Röhm GmbH, Darmstadt (DE)

( * ) Notice: Subject to any disclaimer, the term of this patent is extended or adjusted under 35 U.S.C. 154(b) by 186 days.

(21) Appl. No.: 12/663,709

(22) PCT Filed: May 9, 2008

(86) PCT No.: PCT/EP2008/055725
§ 371 (c)(1),
(2), (4) Date: Dec. 9, 2009

(87) PCT Pub. No.: WO2009/007154
PCT Pub. Date: Jan. 15, 2009

(65) Prior Publication Data
US 2010/0163177 A1  Jul. 1, 2010

(30) Foreign Application Priority Data

Jul. 10, 2007 (DE) .......................... 10 2007 032 403

(51) Int. Cl.
*C08F 220/28* (2006.01)
*C08F 226/00* (2006.01)
*C09J 11/06* (2006.01)
(52) U.S. Cl. ......... 526/320; 526/312; 526/321; 156/305
(58) Field of Classification Search ................. 526/320, 526/321, 312; 156/305
See application file for complete search history.

(56) References Cited

U.S. PATENT DOCUMENTS 3,681,269 A * 8/1972 Heitz et al. ..................... 521/149
5,684,107 A * 11/1997 Schneider et al. .......... 526/303.1

FOREIGN PATENT DOCUMENTS

| DE | 42 26 198 A1 | 11/1993 |
| DE | 197 48 631 A1 | 5/1999 |
| EP | 1 616 906 A1 | 1/2006 |
| EP | 1 616 906 B1 | 1/2006 |
| JP | 62-22882 | 1/1987 |
| JP | 62022882 A * | 1/1987 |
| JP | 2007-099911 A | 4/2007 |
| WO | WO 99/23401 A1 | 5/1999 |

OTHER PUBLICATIONS

German Search Report issued Jul. 10, 2007, in German Patent Application No. 10 2007 032 403.2 with English translation of category of cited documents.
Russian Search Report mailed Apr. 27, 2012 in corresponding Russian Patent Application No. 2010 104 102, (4 pp.).

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

A method for producing a swellable polymer by polymerizing a composition containing at least one polyalkylene glycol di(meth)acrylate having a weight-average molecular weight from 2500 g/mol to 10000 g/mol, wherein the polymer contains at least 50.0% by weight based on the total weight of the polymer of said at least one polyalkylene glycol di(meth) acrylate.

19 Claims, No Drawings

USE OF SWELLABLE POLYMER FOR SEALING

The present invention relates to the use of a swellable polymer for sealing.

STATE OF THE ART

Swellable polymers and their use in sealants are already known per se. For instance, Japanese patent application JP 62-129376 proposes a composition which is suitable for preventing the failure of seals in wastewater channels without release of water. The composition comprises a (meth)acrylate, especially a magnesium or sodium salt, polyethylene glycol di(meth)acrylate, especially a water-soluble polyethylene glycol (meth)acrylate which may contain 20-30% by weight of mono(meth)acrylate units, and a polymerization catalyst, especially a redox initiator.

European patent application EP 0 376 094 describes a gel-forming injection medium for sealing pipelines or buildings, or for forming water-impermeable base layers based on hydroxyalkyl esters of acrylic acid or methacrylic acid and crosslinking monomers. The medium should contain at least 2% by weight of a tertiary amine which is derived from acrylic acid or methacrylic acid and, together with the peroxodisulphate, forms an initiator system. The crosslinking, polyethylenically unsaturated, free-radically polymerizable monomers proposed are especially diacrylates and dimethacrylates of polyethylene glycols which should, as far as possible, contain 1-10 ethylene oxide units, and also methylenebisacrylamide or methacrylamide, acrylamidomethyl ether and methacrylamidomethyl ether of the polyethylene glycols mentioned.

Japanese patent application JP 02-206657 uses, for sealing defective water seals, a liquid mixture which comprises a monomer, for example acrylamide, polyethylene glycol dimethacrylate or n-methylolpropane, a water-absorbing polymer resin and a water-dispersing rubber latex, for example SBR, NBR, natural rubber or chloroprene rubber. The liquid mixture is reacted with a reaction catalyst in order to give rise to the desired water sealing material.

Japanese patent application JP 2003193032 A discloses a water sealing composition based on an aqueous solution which comprises a water-soluble polyalkylene glycol di(meth)acrylate, an anionic electrolyte monomer, an alcohol having two or more hydroxyl groups and a polymerization catalyst. The weight ratio of the polyalkylene glycol di(meth) acrylate relative to the anionic electrolyte monomer should be in the range of 98:2 to 40:60. The proportion of the anionic electrolyte monomer is 5-70% by weight based on the total weight of the solution.

Japanese patent application JP 62-022882 A describes a water-sealing composition which comprises a redox polymerization initiator, a polyethylene glycol di(meth)acrylate having 2 to 50 repeat units, an anionic electrolyte monomer and a cationic electrolyte monomer in particular quantitative ratios.

International patent application WO 97/03151 relates to a lubricant which comprises a polymerizable liquid acrylate ester monomer and a peroxy polymerization initiator. Preference is given to using polyethylene glycol dimethacrylates as polymerizable polyacrylate esters.

European patent application EP 0 470 008 A1 relates to a composition based on at least one water-soluble or water-dispersible alkoxyalkyl ester of an unsaturated carboxylic acid. The composition comprises at least one polyalkoxymethoxyethyl methacrylate or acrylate, at least one initiator from the group of the alkali metal persulphates, ammonium persulphates and hydrogen peroxides, at least one polymerization accelerant and water. The composition may be used especially for underground sealing.

DE 1974 86 31 describes general sealing materials and mentions, in a table, also the substance polyethylene glycol methacrylate, which, however, is a monofunctional compound. There is a lack of information regarding the molecular weight of the compound.

DE 422 61 98 describes water-swellable sealants composed of methacrylate monomers, for example ethoxylated TMPTMA (in the example, MW=1000, otherwise no further data); the mixture additionally comprises polyethylene glycol which is not copolymerized.

Patent application EP 1 616 906 relates to water-swellable sealants formed from methacrylate monomers; in the examples, only (meth)acrylic acid can be found, which is coextruded.

PROBLEM AND SOLUTION

In view of the prior art, the object of the present invention was to indicate means of better sealing of sites of defective sealing. At the same time, the sealing materials should especially have an improved swellability and very good mechanical properties. Moreover, the sealing should be achievable in a very simple and rapid manner. Finally, it was also an aim of the present invention to achieve a very efficient and lasting seal.

These objects, and further objects which are not stated explicitly but arise inevitably from the connections discussed by way of introduction, are achieved by the use of a swellable polymer having all features of the present Claim 1. Particularly appropriate procedures are described in the subclaims referring back to Claim 1. Additionally protected is a method for sealing a site of defective sealing.

By virtue of using a swellable polymer obtainable by polymerizing a composition which comprises at least one polyalkylene glycol di(meth)acrylate having a weight-average molecular weight greater than 2500 g/mol for sealing, it is possible in a not immediately foreseeable manner to achieve better sealing of sites of defective sealing. At the same time, the sealing material is notable especially for improved swellability, and the mechanical properties, especially the tensile strength and elongation at break, are comparatively good. Moreover, the sealing can be achieved in an extremely simple and comparatively rapid manner, and it is possible to achieve an exceedingly efficient and lasting seal. Furthermore, the polymer used in accordance with the invention is uncontroversial both in ecological and health terms.

In the context of the present invention, a swellable polymer is used for sealing. In this connection, "swellable" means that the polymer changes its shape and increases its volume under the action of a solvent. Solvents preferred for the purposes of the present invention are polar compounds having a relative dielectric constant greater than 10, measured at 25° C., especially water and alcohols having 1 to 4 carbon atoms, very particular preference being given to water. Appropriately, swelling of at least 150%, especially of at least 200%, can be achieved.

The polymer to be used in accordance with the invention is obtainable by polymerizing a composition which comprises at least one polyalkylene glycol di(meth)acrylate having a weight-average molecular weight greater than 2500 g/mol, preferably in the range of 2500 to 10 000 g/mol, more preferably greater than 5000 g/mol, especially greater than 8000 g/mol.

The molecular weight can be determined in a manner known per se by gel permeation (GPC) or light scattering. A particularly useful method has been found to be determination by means of GPC.

The polyalkylene glycol di(meth)acrylate preferably comprises ethylene glycol units and/or propylene glycol units, the proportion of these units being preferably at least 50.0% by weight, appropriately at least 75.0% by weight, especially at least 90.0% by weight, based in each case on the total weight of the polymer. Polyethylene glycol di(meth)acrylate units are particularly preferred.

The polymer may optionally have further comonomer units. Preference is given to polymers which are obtainable by copolymerizing with copolymerizable amines and/or hydroxyalkyl esters. Very particularly preferred copolymerizable amines are tertiary amines of the formula (I)

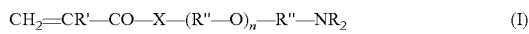

$$CH_2=CR'—CO—X—(R''—O)_n—R''—NR_2 \qquad (I)$$

in which R is an alkyl, hydroxyalkyl or alkoxyalkyl radical, in each case having 1 to 4 carbon atoms in the alkyl radical or alkoxy radical, or both R radicals together with the nitrogen atom form a heterocyclic ring, and R' is a hydrogen atom or a methyl group, X is an oxygen atom or an —NR— or —NH— group and R'' is an alkylene group having 2 to 4 carbon atoms and n is an integer of 0 to 4.

The tertiary amines indicated by the formula are preferably water-soluble substituted esters or amides of acrylic acid and/or methacrylic acid. In the case of the acrylic acid derivatives, R'=H; in the case of the methacrylic acid derivatives, R'=$CH_3$. Owing to their higher hydrolysis stability, the amides are preferred over the esters. They preferably contain the X group=NH. Useful R'' groups are, for example, 1,2-propylene, 1,2- and 1,4-butylene, and preferably 1,2-ethylene and 1,3-propylene groups. In general, n=0. In ester-type compounds of the above formula, i.e. where X=O, n preferably has a value of 0 to 4, especially of 0 to 2. The R radicals on the tertiary amine nitrogen atom are preferably alkyl or hydroxyalkyl radicals having 1 to 4 carbon atoms, especially methyl groups. The two R radicals may, together with the nitrogen atom, form a preferably 5- or 6-membered heterocycle, for example a pyrrolidine, piperidine or morpholine ring.

Particularly preferred tertiary amines are 2-dimethylaminoethyl acrylate and methacrylate, 3-(N,N-dimethylamino) propyl acrylate and methacrylate, 4-(N,N-dimethylamino) butyl acrylate and methacrylate, 3-(N,N-dimethylamino) propylacrylamide and -methacrylamide, triethanolamine monoacrylate and monomethacrylate, 2-(dimethylaminoethyloxy)ethyl acrylate and meth-acrylate, 2-imidazolylethyl acrylate and methacrylate, 2-piperazinylethyl acrylate and methacrylate, 2-piperazinylethylacrylamide and methacrylamide, N,N-dimethylaminoneopentyl acrylate and methacrylate, N,N-dimethylaminoneopentylacrylamide and -methacrylamide, (1,2,2,6,6-pentamethylpiperidyl-4) acrylate and methacrylate, 3-morpholinopropylacrylamide and -methacrylamide, 2-morpholinoethyl acrylate and methacrylate, 2-(N,N-dibutylamino)ethyl acrylate and methacrylate, 4-diethylamino-1-methylbutylacrylamide and -methacrylamide.

Useful hydroxyalkyl esters of acrylic acid and/or methacrylic acid are especially water-soluble esters having 2 to 4 carbon atoms in the hydroxyalkyl radical, such as hydroxyethyl acrylate and methacrylate, 2-hydroxypropyl acrylate and methacrylate, 2- or 4-hydroxybutyl acrylate and methacrylate. Hydroxy (polyalkoxyalkyl)esters of the structure $CH_2=CR—CO—O-(Alk-O)_x—H$, where R=H or $CH_3$, Alk is an alkylene radical having 2 to 4 carbon atoms and x is an integer of 0 to 10, are also suitable.

The monomers used preferably have such a water solubility that they form, overall, at 20° C., an at least 10% by weight, preferably a 20% by weight to 60% by weight, aqueous solution. Since the dissolved monomers in some cases act mutually as solubilizers, such monomers which, alone, are not completely miscible with water, may also be used or used additionally. However, particular preference is given to monomers which are completely miscible with water at temperatures in the range of –5° C. to +40° C.

Polymers usable very particularly advantageously in accordance with the invention are obtainable by polymerizing a composition which comprises a polyethylene glycol dimethacrylate having a molecular weight M of at least equal to 2500 g/mol, better greater than 5000 g/mol, and at least one further (meth)acrylate monomer, especially (meth)acrylic acid and amino(meth)acrylates.

The polymer can otherwise be used to seal a site of defective sealing in a manner known per se, by applying the polymer to the site to be sealed. However, a particularly favourable procedure is one in which a composition which comprises at least one polyalkylene glycol di(meth)acrylate having a weight-average molecular weight greater than 1200 g/mol is applied to the site of defective sealing and polymerized.

The polymerization is effected preferably using a free radical-forming initiator at temperatures in the range of 0° C. to 100° C.

The composition is preferably hardened by adding 1% by weight to 7% by weight, based on the total weight of the composition, of a water-soluble inorganic peroxodisulphate, such as alkali metal peroxodisulphate or ammonium peroxodisulphate, at temperatures above 0° C., preferably at a temperature of 5° C. to 40° C., within a short time, to form a flexible gel. The hardening time is preferably 20 seconds to 120 seconds, but more preferably less than 60 seconds. In addition to or in place of peroxodisulphate, it is also possible to use other water-soluble free radical-forming initiators such as tert-butyl hydroperoxide in an effective amount, provided that they form a redox system effective at low temperatures together with the tertiary amine.

Owing to the very rapid hardening even at low temperature, special precautions are appropriate to convey the composition, after the initiator has been added, to the site of use at which it should solidify to a gel. A mixing chamber with low capacity is used favourably, into which the composition and a preferably aqueous solution of the initiator are introduced such that they immediately mix intimately and then pass directly to the site of application.

The composition should be employed as far as possible with a concentration at which the free-radical polymerization directly forms a gel with the desired properties. A suitable concentration is, for example, 10% by weight to 60% by weight, preferably 20% by weight to 40% by weight, of polymerizable compounds.

The present invention is illustrated further by the examples and comparative examples which follow, without any intention that this should restrict the concept of the invention.

Mixture for the Slab Polymerization 0.20% by weight (0.12 g) of 2,2'-azobisisobutyronitrile (AIBN)

49.9% by weight (29.94 g) of polyethylene glycol dimethacrylate 29.94% by weight (17.96 g) of acrylic acid 19.96% by weight (11.98 g) of 2-dimethylaminoethyl methacrylate Experimental Description for Polymerization Slab polymers were produced in the flat chamber method in chambers formed from glass plates. The spacer used was 4 mm round cord. The polymerization was effected in a water bath at 60° C. over a period of 7 hours. Removal of the upper glass plate and of the round cord were followed by heat treatment in a forced-air drying cabinet at 100° C. for 18 hours.

Mechanical Properties

To measure the mechanical properties, the polymers were stored in distilled water for three days. The specimens were punched out of the polymer slabs in the swollen state.

Test Description for Swelling

From the slab polymers, specimens of dimensions 20×15×4 mm were cut to size. These were conditioned in a vacuum drying cabinet at 100° C. for 18 hours. After cooling to room temperature, the specimens were weighed and then stored on stainless steel meshes in clear glass bottles in distilled water (100 ml) in a climate-controlled room at 23° C. At regular intervals, they were taken out, adhering liquid was absorbed with an absorptive paper, and the polymer pieces were weighed again. The measurement was continued until the maximum swellability had been attained.

TABLE 1

Results

| | Comp. Ex. 1 | Comp. Ex. 2 | Example 1 | Example 2 |
|---|---|---|---|---|
| Polymerization | in aqueous solution | in bulk | in bulk | in bulk |
| Crosslinker | PEG-1000-DMA | PEG-1000-DMA | PEG-6000-DMA | PEG-8000-DMA |
| Swellability (%) | 103 | 108 | 238 | 241 |
| Tensile strength (MPa) | 0.48 | 0.47 | 0.27 | 0.28 |
| (Nom.) elongation at break (%) | 38 | 10.3 | 71.3 | 76.3 |

The results show that the swellability of the inventive examples is increased significantly. The testing of the elongation at break likewise shows a significantly improved value. In contrast, the tensile strength is somewhat poorer but is at a comparable level (ISO 527-3/2/25 at clamped length 25 mm).

The invention claimed is:

1. A method for producing a swellable polymer, comprising polymerizing a composition which comprises at least one polyalkylene glycol di(meth)acrylate having a weight-average molecular weight from 5,000 g/mol to 10,000 g/mol, wherein said polymer comprises at least 50.0% by weight based on the total weight of the polymer of said at least one polyalkylene glycol di(meth)acrylate.

2. The method according to claim 1, wherein the polyalkylene glycol di(meth)acrylate comprises at least one of an ethylene glycol unit and a propylene glycol unit.

3. The method according to claim 2, wherein the composition comprises a polyethylene glycol di(meth)acrylate.

4. The method according to claim 1, wherein the polyalkylene glycol di(meth)acrylate has a weight-average molecular weight greater than 8000 g/mol.

5. The method according to claim 1, comprising copolymerizing a composition which comprises at least one of amine and hydroxyalkyl ester, which is copolymerizable with polyalkylene glycol di(meth)acrylate.

6. The method according to claim 5, wherein the amine comprises at least one tertiary amine of the formula (I)

$$CH_2=CR'-CO-X-(R''-O)_n-R''NR_2 \quad (I)$$

in which R is an alkyl, hydroxyalkyl or alkoxyalkyl radical, in each case having 1 to 4 carbon atoms in the alkyl radical or alkoxy radical, or both R radicals together with the nitrogen atom form a heterocyclic ring, and R' is a hydrogen atom or a methyl group, X is an oxygen atom or an —NR— or —NH— group and R'' is an alkylene group having 2 to 4 carbon atoms and n is an integer of 0 to 4.

7. The method according to claim 5, wherein the composition comprises at least one hydroxyalkyl ester of at least one of acrylic acid and methacrylic acid.

8. A method for sealing a site of defective sealing, comprising applying a composition which comprises at least one polyalkylene glycol di(meth)acrylate having a weight-average molecular weight from 5,000 g/mol to 10,000 g/mol to the site of defective sealing and polymerizing the composition, wherein said composition comprises at least 50.0% by weight based on the total weight of the polymer produced by said polymerizing of said at least one polyalkylene glycol di(meth)acrylate.

9. The method according to claim 8, comprising polymerizing the composition with a free radical-forming initiator at a temperature in the range of 0° C. to 100° C.

10. The method according to claim 1, wherein said swellable polymer swells at least 150% in a solvent selected from the group consisting of a polar compound having a relative dielectic constant of greater than 10 at 25° C., an alcohol having 1 to 4 carbon atoms, and water.

11. The method according to claim 1, wherein said polymer comprises ethylene glycol units in a proportion of at least 50.0% by weight based on the total weight of the polymer.

12. The method according to claim 1, wherein said polymer comprises ethylene glycol units in a proportion of at least 75.0% by weight based on the total weight of the polymer.

13. The method according to claim 1, wherein said polymer comprises ethylene glycol units in a proportion of at least 90.0% by weight based on the total weight of the polymer.

14. The method according to claim 1, wherein said polymer comprises propylene glycol units in a proportion of at least 50.0% by weight based on the total weight of the polymer.

15. The method according to claim 1, wherein said polymer comprises propylene glycol units in a proportion of at least 75.0% by weight based on the total weight of the polymer.

16. The method according to claim 1, wherein said polymer comprises propylene glycol units in a proportion of at least 90.0% by weight based on the total weight of the polymer.

17. The method according to claim 8, wherein said method comprises hardening said composition by adding 1% by weight to 7% by weight, based on the total weight of the composition, of a water-soluble inorganic peroxodisulphate at a temperature ranging from 0° C. to 40° C.

18. The method according to claim 9, wherein said polyalkylene glycol di(meth)acrylate and said free radical-forming initiator are intimately mixed in a mixing chamber and directly applied to the site of defective sealing.

19. The method according to claim 8, wherein said composition comprises from 20% by weight to 40% by weight of polymerizable compounds.

* * * * *